Figure 1:
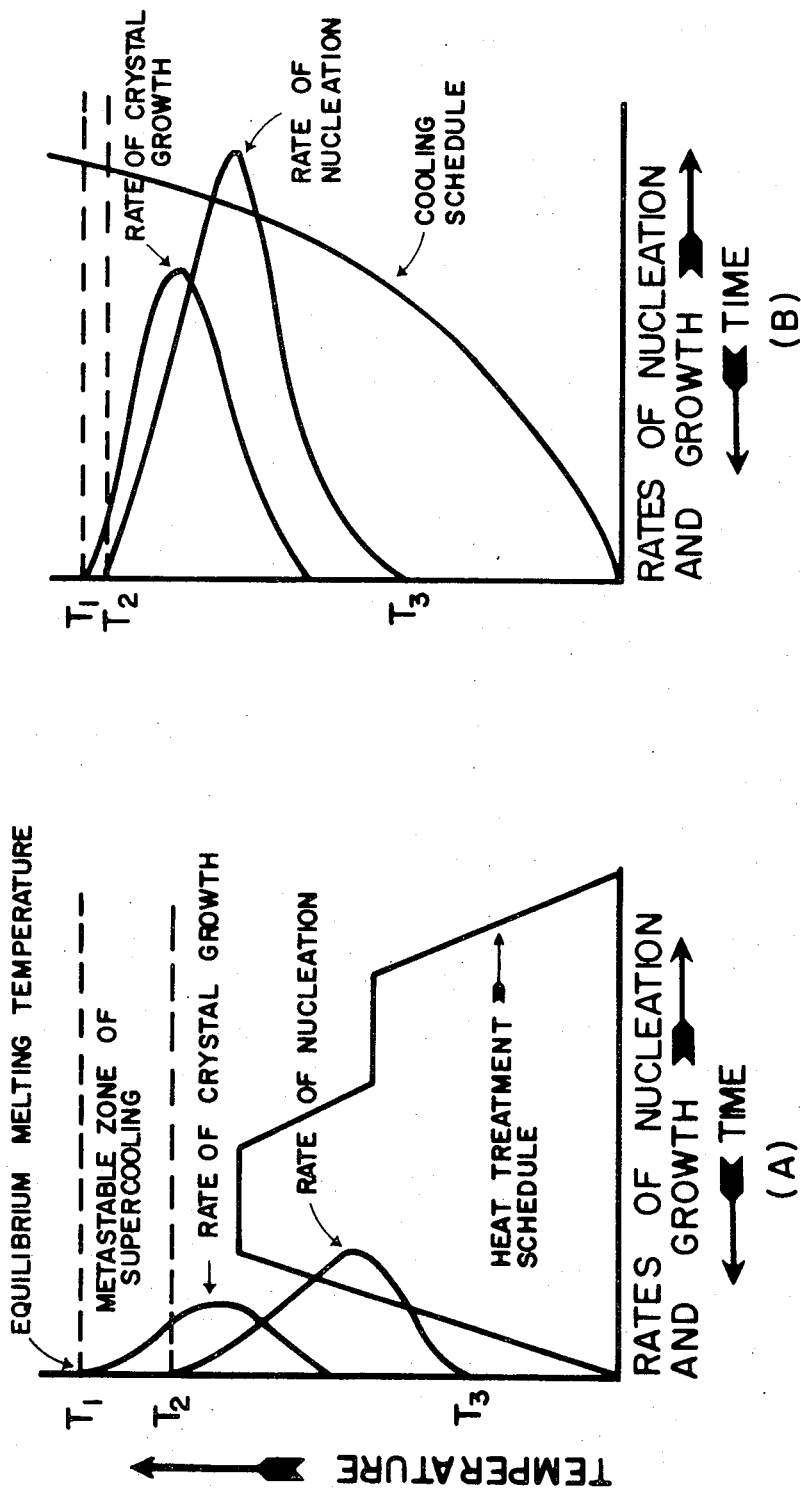

United States Patent [19]

Rittler

[11] 3,989,496

[45] Nov. 2, 1976

[54] SPONTANEOUSLY-FORMED GLASS-CERAMICS CONTAINING BARIUM AND/OR STRONTIUM IRON SILICATE CRYSTALS

[75] Inventor: Hermann L. Rittler, Horseheads, N.Y.

[73] Assignee: Corning Glass Works, Corning, N.Y.

[22] Filed: Mar. 19, 1975

[21] Appl. No.: 559,731

[52] U.S. Cl. .................................. 65/33; 106/39.6
[51] Int. Cl.² ...................... C03B 32/00; C03C 3/22
[58] Field of Search................. 106/39.6, 39.7, 39.8; 65/33

[56] References Cited
UNITED STATES PATENTS
3,804,608    4/1974    Gaskell et al. ..................... 106/39.7

Primary Examiner—Winston A. Douglas
Assistant Examiner—Mark Bell
Attorney, Agent, or Firm—Clinton S. Janes, Jr.; Clarence R. Patty, Jr.

[57] ABSTRACT

The present invention is concerned with the production of articles having the physical properties and internal microstructure normally associated with glass-ceramic articles, but which can be formed spontaneously from a molten glass batch. Hence, the instant invention avoids the heat treatment of a precursor glass body, such as is required in the manufacture of conventional glass-ceramic bodies to cause the crystallization in situ thereof. More specifically, this invention relates to the production of highly-crystalline glass-ceramic articles having compositions within the BaO and/or SrO-Fe$_2$O$_3$-SiO$_2$ field, wherein BaO and/or SrO-Fe$_2$O$_3$-SiO$_2$ solid solution crystals comprise the predominant crystal phase, which can be formed spontaneously from a molten glass batch.

5 Claims, 2 Drawing Figures

SPONTANEOUSLY-FORMED GLASS-CERAMICS CONTAINING BARIUM AND/OR STRONTIUM IRON SILICATE CRYSTALS

U.S. application Ser. Nos. 559,725 and 559,787, filed concurrently herewith by D. G. Grossman, and U.S. application Ser. No. 559,732, filed concurrently herewith by J. E. Flannery and D. R. Wexell, describe the manufacture of spontaneously-formed glass-ceramic articles wherein a fluormica constitutes the primary crystal phase. U.S. application Ser. Nos. 559,727, 559,789, and 559,726, also filed concurrently herewith by D. G. Grossman describe the production of spontaneously-formed glass-ceramic bodies wherein beta-spodumene solid solution, mullite, and celsian, respectively, comprises the principal crystal phase. U.S. application Ser. No. 559,786, likewise filed concurrently herewith by G. H. Beall, discloses the manufacture of spontaneously-formed glass-ceramic articles wherein alpha-quartz solid solution constitutes the predominant crystal phase. U.S. application Ser. No. 559,788, also filed concurrently herewith by G. H. Beall, P. E. Blaszyk, and W. T. Brydges, III, discusses the manufacture of spontaneously-formed glass-ceramic articles wherein beta-spodumene solid solution constitutes the principal crystal phase. Finally, U.S. application Ser. No. 559,730, filed concurrently herewith by the present applicant, describes the production of spontaneously-formed glass-ceramic articles wherein carnegieite and/or nepheline solid solution comprises the primary crystal phase.

The genesis of the glass-ceramic art is found in U.S. Pat. No. 2,920,971. Therein it is explained that the formation of conventional glass-ceramic articles is grounded in the controlled heat treatment of a parent or precursor glass article at elevated temperatures. Hence, the method for making the classic glass-ceramic article contemplates three general steps. First, a glass-forming batch, normally containing a nucleating agent, is melted. Second, this melt is simultaneously cooled to at least within and, more commonly, to below the transformation range to produce an essentially crystal-free glass and a body of a desired geometry is shaped therefrom. Third, this glass body is heated to a temperature above the transformation range thereof to cause the growth of crystals therein in situ. [The transformation range has been defined as that temperature at which a molten mass is converted into an amorphous solid, and has commonly been deemed to lie in the vicinity of the annealing point of a glass.]

In the more usual practice, the third or crystallization step is carried out in two parts. Initially, the precursor glass shape is heated to a temperature slightly above the transformation range and held thereat for a period of time sufficient to achieve substantial nucleation. Subsequently, the nucleated body is heated to a still higher temperature, normally above the softening point of the precursor glass, and maintained at that temperature for a sufficient length of time to effect the growth of crystals on the nuclei.

This controlled heat treatment of the glass body produces a homogeneously-crystallized article wherein the crystals are relatively uniformly fine-grained. However, a more detailed description of the microstructure and the process parameters for forming the conventional glass-ceramic article is provided in U.S. Pat. No. 2,920,971 and reference is again made to that patent for further discussion.

In the commercial production of glass articles, it has frequently been observed that crystallization will take place during the cooling and forming of the melt. This crystallization usually commences at the surface of the melt or at the interface between the molten batch and a forming element, and then grows inwardly into the glass body. The phenomenon has been termed "normal devitrification" and is commonly deemed to be undesirable because the final microstructure consists of non-uniformly sized, relatively coarse-grained crystals which are customarily oriented in a plane perpendicular to the surface. This particular type of microstructure usually results in a mechanically-weak article.

The mechanism of "normal" devitrification is basically different from that involved in the production of glass-ceramic bodies in that it is founded upon the growth of crystals at temperatures at or near the liquidus of the molten glass. A further example of crystallization occurring at temperatures in the vicinity of the glass liquidus is that of the fusion casting of refractory ceramic materials. Contrary to that mechanism, the manufacture of glass-ceramic articles by means of the controlled heat treatment of precursor glass bodies contemplates temperatures far below the glass liquidus, thereby providing a larger degree of supercooling, which permits crystal development in the glass body at a substantially higher viscosity level. Thus, time plays a significant role in crystal growth in glass-ceramic articles.

The present invention has for its principal objective the production of spontaneously-formed, glass-ceramic bodies. Such articles display the internal microstructure and the physical characteristics closely akin to the conventional glass-ceramic body. Nevertheless, the articles derived from the instant invention can be produced through the simple cooling of a glass-forming melt of a particular composition. Hence, in contrast to the conventional glass-ceramic body, no specific heat treatment of a glass body is required. Crystallization in situ can take place as the molten batch is cooled.

The present invention is founded upon the discovery that certain compositions within the BaO and/or SrO-$Fe_2O_3$-$SiO_2$ system, when cooled from a melt, can yield articles consisting essentially of uniformly fine-grained crystals homogeneously dispersed within a glassy matrix. Such articles will be highly crystalline, i.e., greater than 50% by volume crystalline, and the crystals, themselves, will have diameters of less than about 5 microns with the majority being less than about 1 micron.

FIG. 1 illustrates in graphic form the differences in crystallization mechanism existing between the spontaneously-formed glass-ceramic articles of the present invention and the classic glass-ceramic articles. The most vital element underlying the differences in crystallization mechanism is believed to reside in the overlapping in the nucleation and crystallization rate curves represented therein. Thus, as can be observed, below the equilibrium melting temperature of the viscous liquid $T_1$, there is a range of temperatures ($T_1$–$T_2$) wherein nuclei do not develop at a perceptible rate. This temperature range has been denominated the metastable zone of supercooling. In the case of conventional glass-ceramic compositions, no crystals form at or just below the metastable zone inasmuch as the nucleation rate within that range is so slow that growth sites for crystals are not provided. Therefore, nucleation takes place within the $T_2$–$T_3$ temperature interval.

The crystallization mechanism involved in the production of conventional glass-ceramic articles is pictured in FIG. 1(A). As is depicted there, crystallization is obtained by first reheating the supercooled liquid, viz., the parent glass body, into the region of maximum nucleation, maintaining that temperature for an adequate length of time to secure the substantial development of nuclei, and thereafter raising the temperature of the nucleated glass body into the zone of maximum growth and holding thereat for a period of time sufficient to achieve the desired crystal growth.

FIG. 1(B) exhibits the contrasting crystallization mechanism forming the basis for the production of the spontaneously-formed glass-ceramic articles of the present invention. It can readily be seen that the metastable region of supercooling is considerably reduced and the rates of nucleation and crystallization substantially increased. These factors lead to an understanding that nucleation and crystallization can occur at such a rapid rate immediately below the zone of metastable supercooling that dwell periods of any consequence are not necessary. In sum, the straightforward cooling of the molten batch can produce an article having uniformly fine-grained crystals homogeneously dispersed within a glassy matrix. Nonetheless, it will be recognized that the melt can be quenched at such an extremely rapid rate through the respective ranges of nucleation and crystallization temperatures that a fine-grained glass-ceramic body will not be effected.

U.S. Pat. No. 3,804,608 discloses a group of compositions which can be formed into glass-ceramic articles without employing the reheating step required in the production of conventional glass-ceramic bodies, but no reference is made therein to compositions within the BaO and/or $SrO$-$Fe_2O_3$-$SiO_2$ system of the instant invention wherein BaO and/or $SrO$-$Fe_2O_3$-$SiO_2$ solid solution crystals constitute the predominant crystal phase.

Glass-forming compositions operable in the present invention consist essentially, on a molar basis, of between about BaO and/or $SrO.Fe_2O_3.3SiO_2$ and BaO and/or $SrO.Fe_2O_3.7SiO_2$ which, on an oxide basis in weight percent, constitutes about 8–20% BaO and/or 15–25% SrO, the total BaO + SrO not exceeding about 25%, 20–40% $Fe_2O_3$, and 40–70% $SiO_2$.

The physical appearance of the crystallized materials was generally black and frequently exhibited a brown or red oxidized surface. A fractured surface varied from very fine-grained to waxy. Several of the products demonstrated magnetic properties. X-ray diffraction analyses of powder samples identified solid solution phases of $BaFeSi_4O_{10}$ and $Ba_2FeSi_2O_7$ and strontium analogs thereof. In some products, positive identification of the solid solution phase was not possible, and in a number of products a minor amount of $Fe_3O_4$ was identified along with the solid solution phase. The inclusion of $TiO_2$ as an optional ingredient led to crystals identified as $BaFe_2TiSi_2O_9$. Coefficients of thermal expansion (room temperature to 300° C.) have been measured between about 60–125 × $10^{-7}$/° C. with densities being determined ranging between about 2.9–3.5 g/cm$^3$.

Various compatible metal oxides can optionally be added to the base composition which are useful in adjusting melting and forming behavior of the glass and/or in modifying the chemical and physical properties of the crystallized article. Such oxides include $Na_2O$, $K_2O$, $Rb_2O$, $Cs_2O$, $TiO_2$, $ZrO_2$, and $P_2O_5$. In general, the total of all such additives will not exceed 25% with individual additions preferably not exceeding about 10% by weight. Where $ZrO_2$ is present in substantial amounts, zirconia crystals will often be precipitated in the glass-ceramic body.

Table I records a group of glass compositions, expressed in weight percent on the oxide basis, operable in the instant invention. The actual batch ingredients for the reported base compositions can comprise any materials, either the oxide or other compound, which, when melted together, will be converted into the desired oxide in the proper proportion. The batch components were ballmilled together to aid in obtaining a homogeneous melt and placed into a platinum crucible. After fitting a platinum lid thereover, the crucible was inserted into an electrically-fired furnace operating at about 1600°–1650° C. and retained therein for about six hours. Thereafter, the melt was poured into a graphite or steel mold to produce a slab having dimensions of about 6 inches × 6 inches × ½ inch. The slab was allowed to cool in the ambient atmosphere to a temperature between about 850°–1000° C., as measured with an optical pyrometer, this cooling being accomplished in less than about one minute. The slab was then transferred to an annealer operating at about 800°–900° C., depending upon the composition of the starting material.

During the cooling step, the melt appears to stiffen in the normal manner until a temperature of about 1000°–1050° C. is reached, as determined by an optical pyrometer. At or somewhat below that temperature range, a hazy opalization is visually observed at the surface of the slab and at the interface between the melt and the mold sides, which quickly moves towards the center thereof. Almost immediately thereafter, crystal growth begins. The presence of $P_2O_5$ appears to be useful in inhibiting possible warping tendencies which can occur during the rapid crystallization.

The occurrence of this opalization phenomenon has been found mandatory to assure the subsequent growth of the desired uniformly fine-grained crystallization. FIG. 1(B) is useful in understanding the reason for this. Thus, as is shown therein, there must be a very high degree of nucleation at temperatures near or at the optimum growth temperature to achieve fine-grained crystallization as the molten batch cools. This opalization, generally occurring at about 100°–300° C. above the annealing point of the glass, supplies the required nucleation.

However, whereas spontaneous opalization has been observed in many glasses, unless one of the amorphous phases involved in the opalization is at least partially unstable as a glass and crystallites of some type are precipitated to act as nuclei, there will be no spontaneous crystallization of the major glass components following the opalization phenomenon. The inclusion of $ZrO_2$, $TiO_2$, and/or $P_2O_5$ appears to be helpful in enhancing nucleation and crystal growth.

In sum, although the mechanism involved in the extremely rapid and spontaneous growth of crystals is not totally understood, it is postulated that crystallites are developed at temperatures well above the annealing point of the glass during or immediately after the opalization reaction, which then act as nuclei while the glass mass is still within the temperature range of maximum crystal growth.

TABLE I

|  | 1 | 2 | 3 | 4 | 5 | 6 | 7 | 8 | 9 |
|---|---|---|---|---|---|---|---|---|---|
| $SiO_2$ | 44 % | 51 % | 41 % | 47 % | 54 % | 57 % | 38.3 % | 40.0 % | 40.0 % |
| $Fe_2O_3$ | 39 | 34 | 36 | 32 | 28 | 26 | 33.9 | 35.5 | 35.5 |
| BaO | 17 | 15 | — | — | — | — | 14.8 | 15.5 | 15.5 |
| SrO | — | — | 23 | 21 | 18 | 17 | — | — | — |
| $Na_2O$ | — | — | — | — | — | — | 4.3 | 4.5 | 4.5 |
| $TiO_2$ | — | — | — | — | — | — | 8.7 | — | — |
| $ZrO_2$ | — | — | — | — | — | — | — | 4.5 | — |
| $P_2O_5$ | — | — | — | — | — | — | — | — | 4.5 |

|  | 10 | 11 | 12 | 13 | 14 | 15 | 16 | 17 | 18 |
|---|---|---|---|---|---|---|---|---|---|
| $SiO_2$ | 56.0 % | 58.6 % | 58.6 % | 37.2 % | 39.0 % | 39.0 % | 57.0 % | 36.7 % | 38.3 % |
| $Fe_2O_3$ | 21.6 | 22.5 | 22.5 | 33.1 | 34.5 | 34.5 | 21.9 | 32.5 | 33.9 |
| BaO | 9.5 | 9.9 | 9.9 | 14.4 | 15.0 | 15.0 | 9.7 | 14.2 | 14.8 |
| $Na_2O$ | 4.3 | 4.5 | 4.5 | — | — | — | — | — | — |
| $TiO_2$ | 8.6 | — | — | 8.5 | — | — | — | 8.3 | — |
| $ZrO_2$ | — | 4.5 | — | — | 4.4 | — | — | — | 4.3 |
| $P_2O_5$ | — | — | 4.5 | — | — | 4.4 | 4.4 | — | — |
| $K_2O$ | — | — | — | 6.8 | 7.1 | 7.1 | 7.0 | — | — |
| $Rb_2O$ | — | — | — | — | — | — | — | 8.3 | 8.7 |

|  | 19 | 20 | 21 |
|---|---|---|---|
| $SiO_2$ | 38.3 % | 33.3 % | 32.8 % |
| $Fe_2O_3$ | 33.9 | 29.3 | 28.8 |
| BaO | 14.8 | — | — |
| SrO | — | 18.7 | 18.4 |
| $Rb_2O$ | 8.7 | — | 8.0 |
| $K_2O$ | — | 6.5 | — |
| $TiO_2$ | — | 8.1 | 8.0 |
| $ZrO_2$ | — | — | 4.0 |
| $P_2O_5$ | 4.3 | 4.1 | — |

Table II provides a record of the visual appearance, the internal microstructure as determined through observation of a fracture surface, the crystal phases present as identified by means of X-ray diffraction analysis, and such physical properties as coefficient of thermal expansion (R.T. to 300° C.) and density, where measured. Where the solid solution crystallization could not be positively identified, such is simply reported as unidentified. The coefficient of thermal expansion ($\times 10^{-7}$/° C.) and the density (g/cm$^3$) were determined in accordance with standard measuring techniques. The magnetic behavior was merely observed qualitatively utilizing a permanent magnet.

Figure 2:
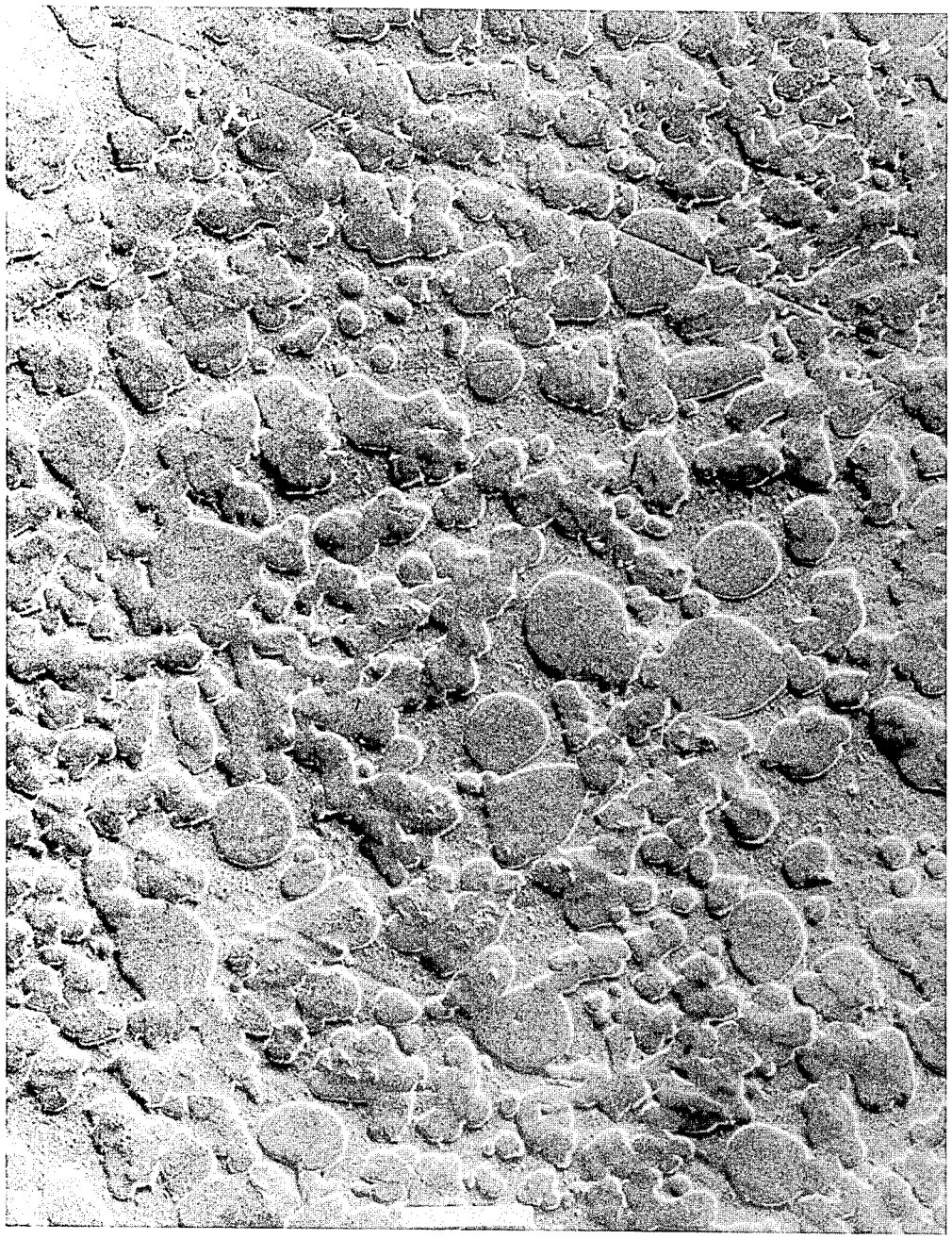

FIG. 2, a replica electron micrograph of the spontaneously-formed slab of Example 1, is illustrative of the typical microstructure of the desired highly crystalline products. The white bar at the base of the photograph represents a distance of one micron. The $Ba_2FeSi_2O_7$ solid solution (s.s.) crystals are seen as flat platelets. It is quite apparent that the diameters thereof are one micron and smaller, and the total crystallinity far exceeds 50% by volume of the slab.

TABLE II

| Example | Visual Description | Microstructure | Crystal Phases | Coef. Exp. | Density | Magnetic |
|---|---|---|---|---|---|---|
| 1 | Red Surface with black interior | Very fine-grained | $Ba_2FeSi_2O_7$ s.s., $Fe_3O_4$ | 93.9 | 3.34 | Yes |
| 2 | " | " | " | 67.2 | 3.157 | " |
| 3 | " | " | $Sr_2FeSi_2O_7$ s.s., $Fe_3O_4$ | 90.7 | 3.459 | " |
| 4 | " | " | " | 75.2 | 3.175 | " |
| 5 | " | " | — | 63.0 | 3.110 | " |
| 6 | " | " | Unknown crystals, $Fe_3O_4$ | — | 2.954 | " |
| 7 | " | " | $Ba_2FeSi_2O_7$ s.s., $Fe_3O_4$ | 89.0 | — | — |
| 8 | " | " | Unknown crystals, $Fe_3O_4$ | 113.2 | — | — |
| 9 | " | " | " | 113.1 | — | — |
| 10 | Brown surface with black interior | " | $BaFe_2TiSi_2O_9$ s.s., $Fe_3O_4$ | 103.8 | — | — |
| 11 | " | " | Unknown crystals | 72.3 | — | — |
| 12 | " | " | — | 74.1 | — | — |
| 13 | Red surface with black interior | Waxy fracture | Unknown crystals | 89.5 | — | — |
| 14 | " | " | $Ba_2FeSi_2O_7$ s.s., $Fe_3O_4$ | 91.5 | — | — |
| 15 | " | " | Unknown crystals, $Fe_3O_4$ | 106.2 | — | — |
| 16 | " | " | — | 67.4 | — | — |
| 17 | " | Very fine-grained | Unknown crystals, $Fe_3O_4$ | 95.1 | — | Yes |
| 18 | " | " | — | 82.9 | — | — |
| 19 | " | " | $BaFeSi_3O_9$, $Fe_3O_4$ | — | — | — |
| 20 | Black throughout | Waxy fracture | $Sr_2FeSi_2O_7$, $Fe_3O_4$ | 124.3 | — | — |
| 21 | " | Very fine-grained | $Sr_2FeSi_2O_7$, $Fe_3O_4$ | 76.0 | — | — |

In summary, the process of the instant invention involves four basic steps. First, a glass-forming batch having a composition within the above-outlined operable ranges is melted. Second, the molten batch is simultaneously cooled to a temperature about 100°–300° C. above the annealing point of the glass to achieve phase separation and nucleation and a glass body shaped therefrom. Third, the glass body is exposed to a temperature between the annealing point of the glass and the temperature of phase separation and nucleation for a period of time sufficient to cause crystallization of the desired solid solution phases of BaO and/or SrO-$Fe_2O_3$-$SiO_2$ with, optionally, $Fe_3O_4$. Fourth, the crystallized body is cooled to room temperature.

As has been emphasized hereinabove, the second or phase separation step is of critical importance to the operability of the invention. Hence, the rate of cooling the molten batch must not be so rapid that adequate time is not provided for the necessary phase separation and nucleation to take place. With the compositions of the present invention, laboratory experience has manifested that cooling rates between about 10°–1000° C./minute insure satisfactory phase separation and nucleation. These phenomena normally occur at temperatures between about 850°–1050° C.

Since the compositions of this invention crystallize very rapidly after the occurrence of the phase separation and nucleation, exposure times within the crystallization range of as little as two minutes may be sufficient to attain high crystallinity, i.e., greater than about 50% by volume of the body and, frequently, in excess of 75% by volume. In general, crystallization will take place at temperatures between about 650°–850° C. However, as was illustrated above, ease in production has recommended that the glass body which has been phase separated and nucleated be placed into an annealer operating at a temperature within or slightly above the crystallization range and cooled to room temperature therein. No special techniques are required in annealing the glass masses to room temperature. Hence, methods standard in the glassmaking art are equally applicable here. Annealing times as brief as 0.5 hour can be utilized, but the usual practice will employ a period of two hours or longer. However, the use of very long annealing schedules does not appear to substantially alter the internal microstructure or the physical properties of the final product. Therefore, such are normally not looked upon with favor from an economic point of view.

Whereas the preferred practice of the invention contemplates crystallizing the article as the phase separated and nucleated glass body is cooled to room temperature, it is possible to cool the melt to room temperature at such a rapid rate that phase separation and nucleation will occur but the subsequent desired fine-grained crystallization will not result so that the body is essentially glassy. However, fine-grained crystallization of that glassy body can be accomplished by exposing it to a temperature within the crystallization range in like manner to that described above with respect to the crystallization obtained as the melt is cooled to room temperature. Thus, it is the occurrence of phase separation and nucleation at temperatures above the crystallization range which is of vital significance to the operability of the invention.

Finally, the mechanical strength of the crystallized bodies may be materially improved by utilizing a thermal tempering process such as is employed with glass articles. Hence, as is shown in Ser. No. 559,788, supra, filed concurrently herewith by Beall, Blaszyk, and Brydges, a comparison of the mechanical strength demonstrated by annealed crystallized articles with that exhibited by crystallized articles rapidly chilled from the crystallization range to room temperature can evidence a substantial enhancement in strength in the latter articles. The quick quenching can be especially effective when the crystallization is undertaken at the upper extreme of the crystallization range. Air tempering, viz., exposing the crystallized article to a blast of cold air to chill it to room temperature, is the preferred technique due to ease of practice and relative low cost, but immersion in various liquids such as oils and salt baths can also be operable.

The mechanism working to impart this improvement in mechanical strength is not clearly understood, but it is believed to involve the small amount of residual glass which is thought to be present as a continuous phase throughout the crystallized body. Support for this belief is deemed to be borne out through a study of FIG. 2 wherein the residual glass is seen as having been removed from the areas around the residual crystals during the leaching step to prepare the replica electron micrograph.

I claim:

1. A method for making a highly crystalline glass-ceramic article consisting essentially of BaO and/or SrO-$Fe_2O_3$-$SiO_2$ solid solution crystals with, optionally, $Fe_3O_4$ dispersed within a glassy matrix, said crystals comprising at least 50% by volume of said article, which comprises the steps of:

a. melting a batch for a glass consisting essentially, by weight on the oxide basis, of about 8–20% BaO and/or 15–25% SrO, the total BaO + SrO not exceeding about 25%, 20–40% $Fe_2O_3$, and 40–70% $SiO_2$;

b. simultaneously cooling said melt at a rate between about 10°–1000° C./minute to a temperature about 850°–1050° C. to shape said melt into a glass body and obtain a phase separation therein;

c. further cooling said shaped glass body and exposing said glass body to a temperature between about 650°–850° C. for a sufficient length of time to cause crystallization of the solid solution phases in said glass body; and then d. cooling the crystallized body to room temperature.

2. A method according to claim 1 wherein said time sufficient to cause crystallization is at least about two minutes.

3. A method according to claim 1 wherein said BaO and/or SrO-$Fe_2O_3$-$SiO_2$ solid solution crystals are selected from the group consisting of $BaFeSi_4O_{10}$, $SrFeSi_4O_{10}$, $BaFeSi_2O_7$, $Sr_2FeSi_2O_7$, and mixtures thereof.

4. A method according to claim 1 wherein said glass also contains up to about 10% $TiO_2$ and that crystals of Ba and/or $SrFe_2TiSi_2O_9$ are present in said crystallized body.

5. A method according to claim 1 wherein said crystallized body is cooled to room temperature by means of a quick chilling technique to thermally temper said body.

* * * * *